US008173201B2

(12) United States Patent
Miura et al.

(10) Patent No.: US 8,173,201 B2
(45) Date of Patent: May 8, 2012

(54) FILM-FORMING METHOD AND FILM-FORMING DEVICE (75) Inventors: Hirotsuna Miura, Fujimi (JP); Yoshikazu Hama, Okaya (JP)

(73) Assignee: Seiko Epson Corporation (JP)

( * ) Notice: Subject to any disclaimer, the term of this patent is extended or adjusted under 35 U.S.C. 154(b) by 907 days.

(21) Appl. No.: 12/185,972

(22) Filed: Aug. 5, 2008

(65) Prior Publication Data

US 2009/0047419 A1 Feb. 19, 2009

(30) Foreign Application Priority Data

Aug. 17, 2007 (JP) ................................. 2007-212648
Jul. 14, 2008 (JP) ................................. 2008-182378

(51) Int. Cl.
*C23C 14/54* (2006.01)
(52) U.S. Cl. ........................................................ 427/10
(58) Field of Classification Search ....................... 427/10
See application file for complete search history.

(56) References Cited

U.S. PATENT DOCUMENTS

| 5,580,607 | A | * | 12/1996 | Takekuma et al. ............ 427/240 |
| 6,506,453 | B2 | | 1/2003 | Ema et al. |
| 6,719,844 | B2 | | 4/2004 | Ema et al. |
| 6,800,569 | B2 | | 10/2004 | Ito et al. |
| 7,312,018 | B2 | | 12/2007 | Ito et al. |
| 7,604,832 | B2 | | 10/2009 | Ito et al. |
| 2004/0089229 | A1 | | 5/2004 | Ema et al. |
| 2008/0090001 | A1 | | 4/2008 | Ito et al. |

FOREIGN PATENT DOCUMENTS

| JP | 05-223559 | 8/1993 |
| JP | 2001-170546 | 6/2001 |
| JP | 2003-234278 | 8/2003 |
| JP | 2004-164801 | 6/2004 |
| JP | 2004-330136 | 11/2004 |
| JP | 2005-152758 | 6/2005 |
| JP | 2006-015271 | 1/2006 |
| JP | 2006-272294 | 10/2006 |
| JP | 2006-276509 | 10/2006 |
| JP | 2006-289242 | 10/2006 |

* cited by examiner

*Primary Examiner* — Elena T Lightfoot
(74) *Attorney, Agent, or Firm* — Harness, Dickey & Pierce, P.L.C.

(57) ABSTRACT

A film-forming method includes: a) discharging a liquid including a film material on an object so as to form a liquid film made of the liquid; b) irradiating the liquid film with light and thus detecting light from the liquid film so as to measure distribution of an optical constant, which is related to a film thickness of a thin film, with respect to the liquid film; and c) drying the liquid film on the object so as to form the thin film by converting the distribution of the optical constant into distribution of a temperature of the liquid film based on converting information that relates the optical constant of the liquid film to the temperature of the liquid film and thus forming the distribution of the temperature on the liquid film.

3 Claims, 7 Drawing Sheets

FILM-FORMING METHOD AND FILM-FORMING DEVICE

BACKGROUND

1. Technical Field

The present invention relates to a film-forming method and a film-forming device.

2. Related Art

Multi-layered substrates made of low temperature co-fired ceramics (LTCC) are widely used for a substrate of a high frequency module, a substrate of an IC package, and the like due to their excellent high-frequency property and high heat-resistance. As a method for manufacturing a film pattern of a wiring and the like included in the LTCC multi-layered substrates, an inkjet method has attracted attention in order to improve productivity and lower a cost. The inkjet method uses a droplet discharge head that discharges a liquid material including a wiring material as a droplet. In the method, the droplet discharge head is allowed to discharge a droplet while the droplet discharge head and a substrate are relatively moved in a main scanning direction. A plurality of droplets including the wiring material are sequentially united along the main scanning direction of the substrate so as to form a liquid film having a linear shape and continuing in the main scanning direction. In the inkjet method, the liquid film having a linear shape is dried so as to form a pattern.

JP-A-2005-152758 discloses a following inkjet method. In the method, a temperature gradient is applied on a surface of a linear liquid film and a high-temperature side end and a low-temperature side end are formed on both sides of the film across a main scanning direction. The liquid film having the temperature gradient forms surface tension distribution on its surface and generates Marangoni convection in its inside. A thermal capillary flow flowing out from the high-temperature side end of the liquid film descends toward a substrate before the flow reaches the low-temperature side end due to the temperature gradient applied to the liquid film. As a result, a wiring material that is not included in a flow path of Marangoni convection is separated out. Due to this wiring material separated out, the spread of the liquid film is pinned. On the other hand, the wiring material is continuously conveyed to the high-temperature side end by the convection, becoming hard to separate out the wiring material. Therefore, as the drying of the liquid film progresses, the high-temperature side end is constricted toward the low-temperature side end of the liquid film, separating out the wiring material only at the low-temperature side end of the liquid film. As a result, the liquid film forms a wiring pattern having a line width narrower than the film itself.

Figure 9A:
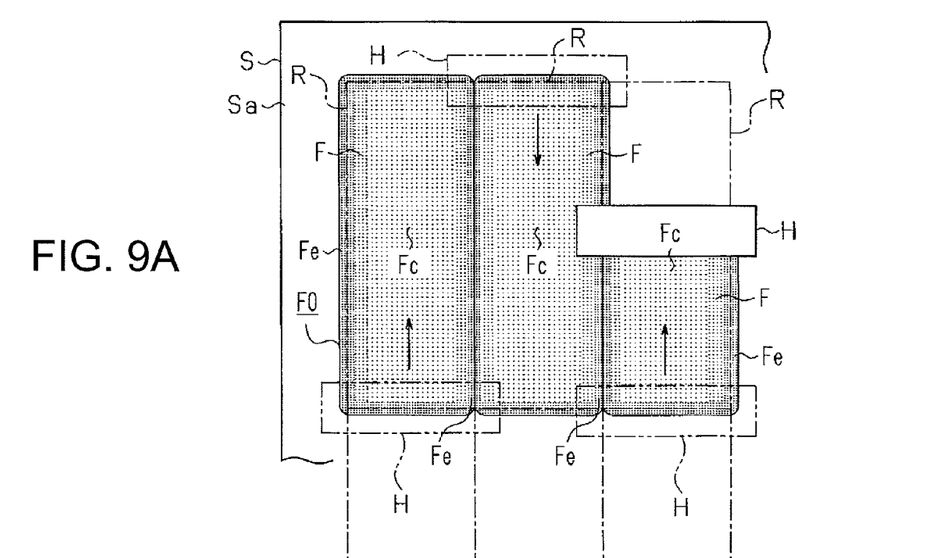
FIG. 9A is a plan view showing a droplet discharging treatment in related art and FIG. 9B is a sectional side view showing the same.
Figure 9B:
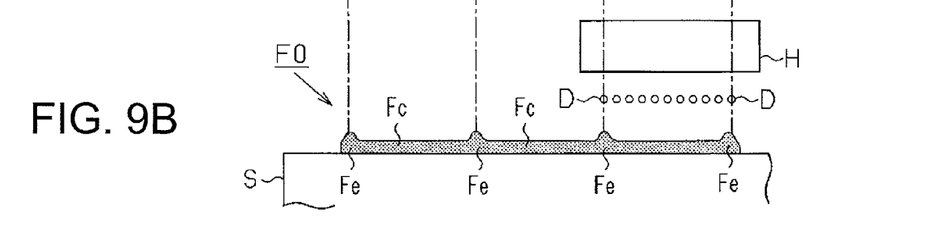
Figure 10A:
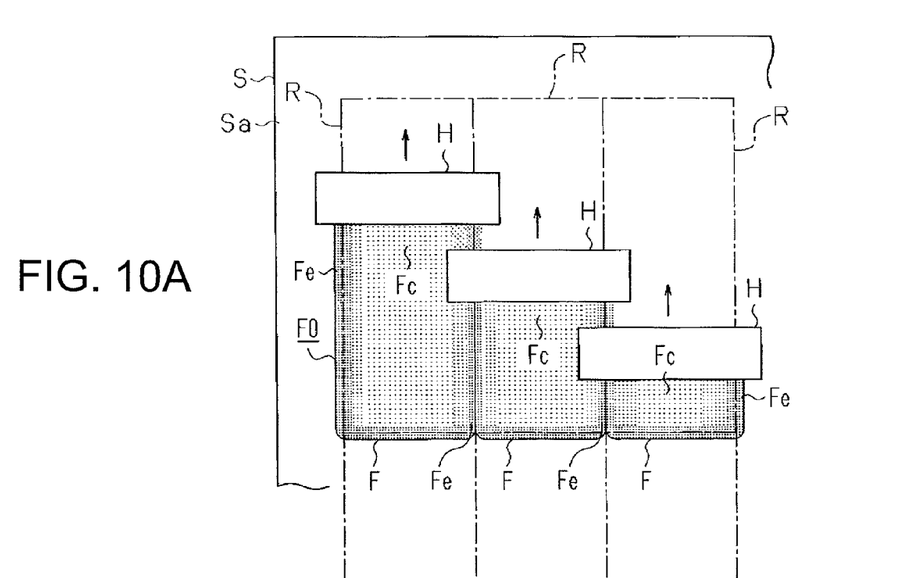
FIG. 10A is a plan view showing another droplet discharging treatment in related art and FIG. 10B is a sectional side view showing the same.
Figure 10B:
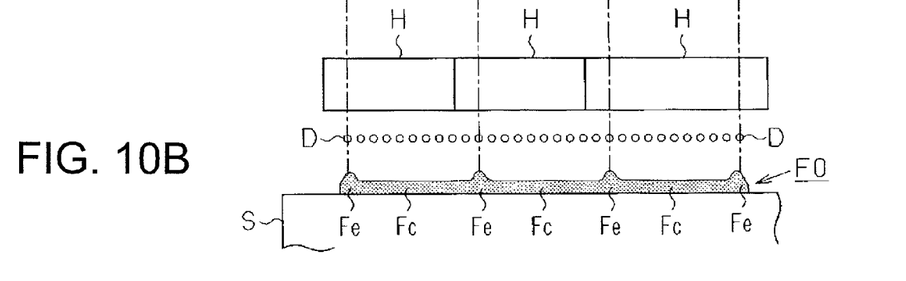

The inkjet method mentioned above has attracted attention also as a method for forming an orientation film that is used for a liquid crystal display, as shown in JP-A-2006-15271, for example. FIGS. 9A and 10A are plan views and FIGS. 9B and 10B are side views schematically showing a film-forming process of an orientation film. In the film-forming process of an orientation film, a droplet discharging treatment in which a droplet D is discharged on a substrate S so as to form a liquid film F0 and a drying treatment in which a solvent and the like included in the liquid film F0 are evaporated so as to dry the liquid film F0 are conducted.

As shown in FIGS. 9A and 9B, on a surface of the substrate S (hereinafter, referred to as a discharge surface Sa), in the droplet discharging treatment, a plurality of discharge regions R extending in a vertical direction are formed in a contiguous manner to be virtually separated in a horizontal direction. A droplet discharge head H moves above the discharge regions R in sequence from the discharge region R that is positioned leftmost along an arrow direction so as to discharge a plurality of droplets D including an orientation film material to the whole of each of the discharge regions R. Thus a partial liquid film F having a liner shape is formed on each of the plurality of discharge regions R. That is, the droplet discharge head H forms the liquid film F0 by multi-scanning. Alternatively, as shown in FIGS. 10A and 10B, a plurality of droplet discharge heads H arranged in a horizontal direction respectively discharge the droplets D on the whole of the discharge regions R so as to form the partial liquid film F on each of the plurality of discharge regions R. That is, the plurality of droplet discharge heads H form the liquid film F0 by single-scanning. Each of a plurality of partial liquid films F is united with adjacent partial liquid film F so as to form the liquid film F0 covering the whole of the substrate S.

In a case of film-forming by multi-scanning, landing timings of the droplets D are different from each other at a boundary between the partial liquid films F that are adjacent by a period of one scanning of the droplet discharge head. Further, even in a case of film-forming by single-scanning, landing timings of the droplets D are different from each other at a boundary between the partial liquid films F that are adjacent by a period between scans of the droplet discharge heads H that are formed with a certain distance.

At end parts (both end parts Fe in a horizontal direction, for example) of the partial liquid film F, a surface area per unit volume is large, so that evaporation probability of an evaporation component at the end parts increases and thus a drying speed becomes higher than that at a central part Fc. Therefore, flowage of the orientation film material occurs inside of the liquid material due to its increased viscosity, so that a concentration of the orientation film material becomes locally high at the both end parts Fe of the partial liquid film F. As a result, if the liquid film F0 is dried, difference in film thickness (contrasting density in FIGS. 9A and 10A) is disadvantageously formed at the both end parts Fe of the liquid film F0 after dried.

SUMMARY

An advantage of the present invention is to provide a film-forming method and a film-forming device that improve a film thickness controllability of a film that is to be formed by drying a liquid film.

A film-forming method according to a first aspect of the invention includes: a) discharging a liquid including a film material on an object so as to form a liquid film made of the liquid; b) irradiating the liquid film with light and thus detecting light from the liquid film so as to measure distribution of an optical constant, which is related to a film thickness of a thin film, with respect to the liquid film; and c) drying the liquid film on the object so as to form the thin film by converting the distribution of the optical constant into distribution of a temperature of the liquid film based on converting information that relates the optical constant of the liquid film to the temperature of the liquid film and thus forming the distribution of the temperature on the liquid film.

According to the method of the first aspect, the distribution of the temperature of the liquid film is determined based on the distribution of the optical constant (reflectance, refractive index, and extinction coefficient) related to the film thickness. Therefore, the film-forming method of the first aspect can change the drying state of the liquid film based on the distribution of the optical constant of the liquid film, so that desired film thickness distribution can be formed on a film to be formed by drying the liquid film, being able to improve controllability of the film thickness.

In the method of the first aspect, the converting information may relate a portion, which includes the film material in high concentration, of the liquid film to a low temperature.

According to the method, the portion including the film material in high concentration becomes to have a low temperature. Therefore, the method can decrease evaporation probability of the portion including the film material in high concentration, thereby being able to make evaporation probability of the liquid film be uniform throughout the whole of the liquid film.

In the method of the first aspect, the converting information may relate a portion, which includes the liquid material in low concentration, of the liquid film to a high temperature.

According to the method, the portion including the film material in low concentration becomes to have a high temperature. Therefore, the method can increase evaporation probability of the portion including the film material in low concentration, thereby being able to make evaporation probability of the liquid film be uniform throughout the whole of the liquid film.

A film-forming method according to a second aspect of the invention includes: d) discharging a liquid including a film material on an object so as to form a liquid film made of the liquid; e) irradiating the liquid film with light and thus detecting light from the liquid film so as to measure a film shape of the liquid film; and f) drying the liquid film on the object so as to form a thin film by converting distribution of the film shape into distribution of a temperature of the liquid film based on converting information that relates the film shape to the temperature of the liquid film and thus forming the distribution of the temperature on the liquid film.

In the film-forming method of the second aspect, the liquid film may be irradiated with light and a position of light from the liquid film may be detected so as to measure the film shape of the liquid film based on a detecting result of the position, in the step e).

In the film-forming method of the second aspect, the liquid film may be irradiated with light from an emitting part and thus a focal distance of the emitting part with respect to the liquid film may be detected so as to measure the film shape of the liquid film based on a detecting result of the focal distance, in the step e).

In the method of the second aspect, interference light by the liquid film may be detected so as to measure the film shape of the liquid film based on a detecting result of the interference light, in the step e).

According to the method, the distribution of the temperature of the liquid film is determined based on the film shape of the liquid film, that is, distribution of the film thickness. Therefore, the method of the second aspect can change the drying state of the liquid film based on the film shape, thereby being able to improve shape controllability of the liquid film, further, film thickness controllability of a film to be formed by drying the liquid film.

In the method of the second aspect, the converting information may relate a thick portion of the liquid film to a low temperature.

According to the method, a portion having a large film thickness becomes to have a low temperature. Therefore, the method can decrease evaporation probability of the portion having a large film thickness, thereby being able to make evaporation probability of the liquid film be uniform throughout the whole of the liquid film.

In the method of the second aspect, the converting information may relate a thin portion of the liquid film to a high temperature.

According to the method, a portion having a small film thickness becomes to have a high temperature. Therefore, the method can increase evaporation probability of the portion having a small film thickness, thereby being able to make evaporation probability of the liquid film be uniform throughout the whole of the liquid film.

In the method, it is preferable that the measuring and the forming of the distribution of the temperature be alternately repeated.

According to the method, distribution of the temperature of the liquid film in a drying process is newly formed, every time the distribution of the optical constant related to the film thickness of the thin film or the film shape is measured. Therefore, the method can more securely improve controllability of the film thickness in accordance with times of measuring the distribution of the film thickness.

A film-forming device according to a third aspect of the invention includes: a discharge head discharging a liquid including a film material to an object so as to form a liquid film on the object; a drying unit drying the liquid film so as to form a thin film on the object; an emitting part emitting light to the liquid film; a liquid film information generating part that detects light from the liquid film and measures distribution of an optical constant related to a film thickness of the thin film with respect to the liquid film so as to generate liquid film information on the distribution of the optical constant; a storing part storing converting information that relates the optical constant of the liquid film to a temperature of the liquid film; and a controlling part converting the liquid film information into temperature information on distribution of the temperature of the liquid film based on the converting information and driving the drying unit based on the temperature information so as to form the distribution of the temperature on the liquid film.

According to the device of the third aspect, the distribution of the temperature of the liquid film is determined based on the distribution of the optical constant (reflectance, refractive index, and extinction coefficient) related to the film thickness. Therefore, the device of the third aspect can change the drying state of the liquid film based on the distribution of the optical constant of the liquid film, so that desired film thickness distribution can be formed on a film to be formed by drying the liquid film, being able to improve controllability of the film thickness.

In the device of the third aspect, the converting information may relate a portion, which includes the film material in high concentration, of the liquid film to a low temperature.

According to the device, the portion including the film material in high concentration becomes to have a low temperature. Therefore, the device can decrease evaporation probability of the portion including the film material in high concentration, thereby being able to make evaporation probability of the liquid film be uniform throughout the whole of the liquid film.

In the device of the third aspect, the converting information may relate a portion, which includes the film material in low concentration, of the liquid film to a high temperature.

According to the device, the portion including the film material in low concentration becomes to have a high temperature. Therefore, the device can increase evaporation probability of the portion including the film material in low concentration, thereby making evaporation probability of the liquid film be uniform throughout the whole of the liquid film.

A film-forming device according to a fourth aspect of the invention includes: a discharge head discharging a liquid including a film material to an object so as to form a liquid film on the object; a drying unit drying the liquid film so as to form a thin film on the object; an emitting part emitting light to the liquid film; a liquid film information generating part that detects light from the liquid film and measures a film shape of the liquid film so as to generate liquid film information on the film shape of the liquid film; a storing part storing converting information that relates the film shape to a temperature of the liquid film; and a controlling part converting the liquid film information into temperature information on temperature distribution of the liquid film based on the converting information, and driving the drying unit based on the temperature information so as to form the temperature distribution on the liquid film.

In the device of the fourth aspect, the liquid film information generating part may include a detecting part detecting light from the liquid film, and calculate a surface coordinate of the liquid film based on a detecting result from the detecting part so as to convert information on the surface coordinate into the liquid information.

In the device of the fourth aspect, the detecting part may detect a position of light from the liquid film, and the liquid film information generating part may calculate the surface coordinate based on the position of light detected by the detecting part.

In the device of the fourth aspect, the detecting part may detect a focal position of the emitting part with respect to the liquid film, and the liquid film information generating part may calculate the surface coordinate based on the focal position detected by the detecting part.

In the device of the fourth aspect, the detecting part may detect interference light by the liquid film, and the liquid film information generating part may calculate the surface coordinate based on the interference light detected by the detecting part.

According to the device of the forth aspect, the distribution of the temperature of the liquid film is determined based on the film shape of the liquid film, that is, distribution of the film thickness. Therefore, the device of the fourth aspect can change the drying state of the liquid film based on the shape of the liquid film, thereby being able to improve shape controllability of the liquid film, further, film thickness controllability of a film to be formed by drying the liquid film.

In the device of the fourth aspect, it is preferable that the converting information relate a thick portion of the liquid film to a low temperature.

According to the device, the portion having a large film thickness becomes to have a low temperature. Therefore, the device can decrease evaporation probability of the portion having a large film thickness, thereby being able to make evaporation probability of the liquid film be uniform throughout the whole of the liquid film. As a result, the device can further improve uniformity of optical property, further, uniformity of the film thickness of a film to be formed by drying the liquid film.

In the device of the fourth aspect, it is preferable that the converting information relate a thin portion of the liquid film to a high temperature.

According to the device, a portion having a small film thickness becomes to have a high temperature. Therefore, the device can increase evaporation probability of the portion having a small film thickness, thereby being able to make evaporation probability of the liquid film be uniform throughout the whole of the liquid film. As a result, the device can further improve uniformity of optical property, further, uniformity of the film thickness of a film to be formed by drying the liquid film.

In the device, it is preferable that the liquid film information generating part update the liquid film information with respect to a single piece of the liquid film, and whenever the film thickness information generating part updates the film thickness information, the controlling part convert the liquid film information into the temperature information so as to form temperature distribution based on the temperature information on the liquid film.

According to the device, distribution of the temperature of the liquid film is newly formed, every time the liquid film information is updated. Therefore, the device can further improve controllability of the film thickness in accordance with times of measuring the distribution of the film thickness.

In the device, the drying unit may include a plurality of heaters thermally contacting with regions, which are different from each other, of the liquid film, and the controlling part may drive each of the plurality of heaters based on the temperature information so as to form the temperature distribution on the liquid film.

According to the device, the distribution of the temperature is formed on the liquid film by heat quantity from each of the heaters. Therefore, the device can improve controllability of temperature distribution, thereby making distribution of evaporation probability of the liquid film be uniform throughout the whole of the liquid film under higher accuracy. As a result, the device can improve uniformity of optical property, further, uniformity of the film thickness of a film to be formed by drying the liquid film.

BRIEF DESCRIPTION OF THE DRAWINGS

The invention will be described with reference to the accompanying drawings, wherein like numbers reference like elements.

DESCRIPTION OF EXEMPLARY EMBODIMENT

Figure 1:
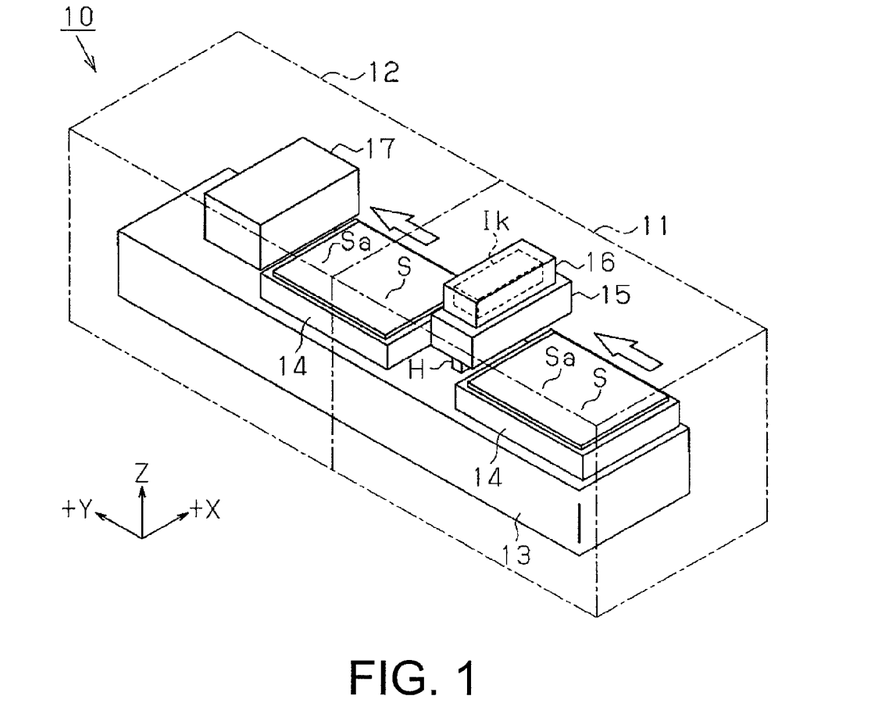
FIG. 1 is a perspective view showing a droplet discharge device according to an embodiment.

An embodiment of the invention will now be described with reference to FIGS. 1 to 8. FIG. 1 is a perspective view showing a droplet discharge device 10 as a film forming device.

Referring to FIG. 1, this droplet discharge device 10 includes a discharging unit 11 for discharging a droplet to a substrate S that is a target workpiece, and a drying unit 12 for drying the discharged droplet. The discharging unit 11 and the drying unit 12 include a base 13 and a substrate stage 14 in common. The base 13 extends in one direction and the substrate stage 14 on which the substrate S is to be placed is mounted on the base 13. The substrate stage 14 positions and fixes the substrate S in a manner allowing one surface of the substrate S to face up and reciprocate between the discharging unit 11 and the drying unit 12 along a longitudinal direction of the base 13 so as to transfer the substrate S to the discharging unit 11 or the drying unit 12. As the substrate S, a substrate such as a green sheet, a glass substrate, a silicon substrate, a ceramic substrate, a resin film, or the like can be used.

In the embodiment, an upper surface of the substrate S is referred to as a discharge surface Sa. The discharge surface Sa is a surface for forming a desired film thereon, and has a position for landing a droplet as a target point. A direction along which the substrate S is conveyed, that is, a direction toward upper left in FIG. 1 is referred to as +Y direction. A direction orthogonal to +Y direction, that is, a direction toward upper right in FIG. 1 is referred to as +X direction, and a normal line direction of the substrate S is referred to as Z direction.

The discharging unit 11 includes a carriage 15 moving along +X direction and an opposite direction of +X direction (−X direction), and an ink tank 16 mounted on an upper side of the carriage 15. Further, the carriage 15 includes a plurality of droplet discharge heads H aligned nearly along +X direction at the lower side thereof, enabling a droplet discharging treatment employing a single scan method.

The carriage 15 moves in +X direction or −X direction when the substrate S is conveyed in +Y direction so as to arrange the droplet discharge heads H above a conveying path of the target point. An action to convey the substrate S in +Y direction and −Y direction is referred to as a main scan. Further, an action to convey the droplet discharge heads H in +X direction and −X direction so as to arrange the droplet discharge heads H above the conveying path of the target point is referred to as a sub scan.

The ink tank 16 stores an ink Ik as a liquid and guides the ink Ik, which is stored, out at a predetermined pressure. As the ink Ik, an ink such as an orientation film ink obtained by dispersing an orientation film material as a film material, an indium tin oxide (ITO) ink obtained by dispersing ITO fine particles, a silver ink obtained by dispersing silver fine particles, and the like can be used.

As the orientation film ink, for example, one prepared by dissolving polyimide or polyamic acid as an orientation film material in a mixed solvent of gamma-butyrolactone, butyl cellosolve, and N-methyl-2-pyrrolidone (having an concentration of solid content with respect to a total mass of the ink of 8 wt %) can be used. As a relative proportion of the mixed solvent, for example, gamma-butyrolactone is 93 wt %, butyl cellosolve is 2 wt %, and N-methyl-2-pyrrolidone is 5 wt %.

As the silver ink, one prepared by dispersing silver fine particles having a grain diameter of 30 nm with trisodium citrate as a dispersing aid in a mixed solvent of water and xylitol, for example. As a relative proportion of the silver ink, for example, water is 40 wt %, xylitol is 20 wt %, and silver particles is 40 wt %.

The drying unit 12 is provided with a film thickness measuring part 17 included in a liquid film information generating part and measuring a film thickness of a liquid film F0 to be formed on the substrate S. When the substrate S is main-scanned, the film thickness measuring part 17 measures a film thickness of the liquid film F0 passing immediately below the film thickness measuring part 17. The film thickness measuring part 17 moves in +X direction and −X direction so as to measure the film thickness of the liquid film F0 throughout the whole of the discharge surface Sa.

Figure 2:
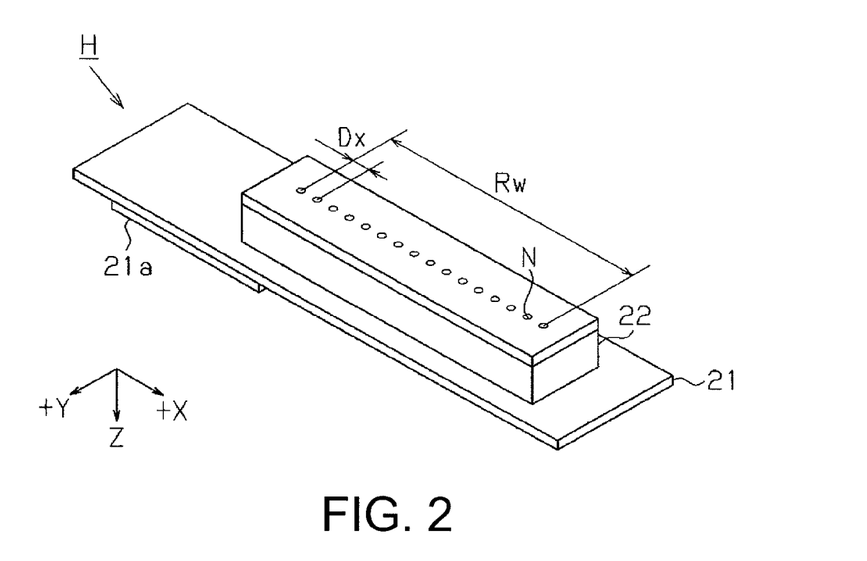
FIG. 2 is a perspective view showing a droplet discharge head according to the embodiment.
Figure 3:
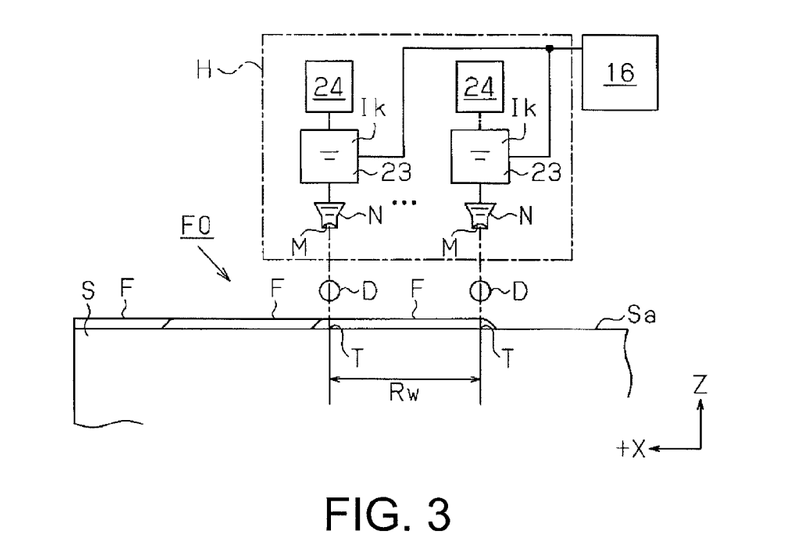
FIG. 3 is a side view schematically showing an inside of the droplet discharge head according to the embodiment.
Figure 4:
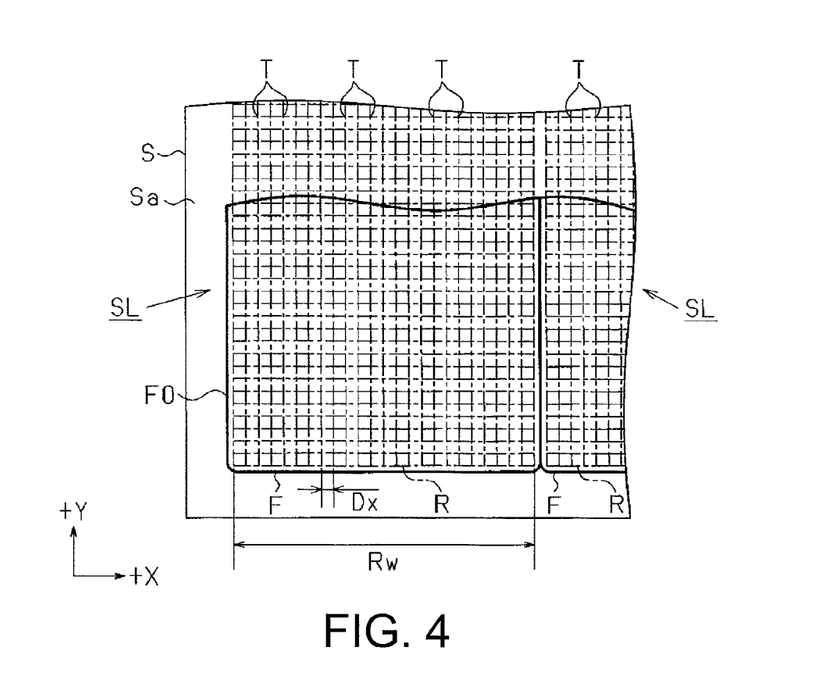
FIG. 4 is a plan view showing a discharging position of a droplet according to the embodiment.

Next, the droplet discharge heads H will be described with reference to FIGS. 2 to 4. FIG. 2 is a perspective view showing one of the droplet discharge heads H viewed from the substrate stage 14. FIG. 3 is a diagram schematically showing an inside of the droplet discharge head H. FIG. 4 is a plan view showing a discharging position on which a droplet D is discharged with the droplet discharge head H.

Referring to FIG. 2, the droplet discharge head H includes a head substrate 21 extending in +X direction and a head body 22 mounted on the head substrate 21. The head substrate 21 is positioned and fixed on the carriage 15 and is moved along +X direction and −X direction with respect to the substrate S. The head substrate 21 includes an input terminal 21a at an end side thereof so as to output various driving signals inputted into the input terminal 21a to the head body 22.

The head body 22 is provided with k (which is an integer number of 1 or more) pieces of nozzles N aligned along nearly whole width of a surface facing the substrate S in +X direction. Each of the nozzles N is a circular hole extending in Z direction, and formed along +X direction at a predetermined pitch. The head body 22 is provided with 180 pieces of nozzles N that are arranged along +X direction at a pitch of 141 μm, for example. In the present embodiment, the pitch to form the nozzles N is referred to as a nozzle pitch Dx, while a width of a nozzle row including the nozzles N is referred to as a nozzle row width Rw. In FIG. 2, the number of nozzles N is simplified for explaining positions of the nozzles N.

Referring to FIG. 3, the head body 22 includes a cavity 23, and a pressure generating element 24 providing pressure to an inside of the cavity 23 so as to correspond to each of the nozzles N. That is, the head body 22 includes k pieces of cavities 23 and k pieces of pressure generating elements 24. The quantity of k is same as the number of the nozzles N. Each of the cavities 23 and each of the pressure generating elements 24 are arranged immediately above one of the nozzles N so as to correspond to the nozzle N. A cavity 23 is coupled with the ink tank 16 that is shared by the k pieces of cavities 23, stores the ink Ik from the ink tank 16, and supplies the ink Ik to a nozzle N with which the cavity 23 communicates. The nozzle N receives the ink Ik from the cavity 23 with which the nozzle N is communicated and forms a gas-liquid interface (hereinafter, simply referred to as a meniscus M) at its own opening.

A pressure generating element 24 applies a predetermined pressure to the inside of the cavity 23 to which the pressure generating element 24 is coupled so as to increase and decrease the pressure inside the cavity 23, thereby vibrating the meniscus M of the nozzle N with which the cavity 23 is communicated. As the pressure generating elements 24, for example, a piezoelectric element that mechanically increases and decreases a volume of the cavities 23, or a resistance heating element that locally increases and decreases a temperature of the cavities 23 can be used.

As show in FIG. 3, when a target point T on the discharge surface Sa is positioned immediately below a nozzle that is selected among the nozzles N (hereinafter, simply referred to as a "selected nozzle"), a cavity 23 communicating with the selected nozzle receives a drive force of corresponding pressure generating element 24 and therefore vibrates the meniscus M of the selected nozzle so as to discharge a part of the ink Ik from the selected nozzle as the droplet D in a predetermined amount. The droplet D discharged from the nozzle N travels along a normal line of the discharge surface Sa and lands on the target point T.

Referring to FIG. 4, the discharge surface Sa of the substrate S includes a plurality of discharge regions R extending in +Y direction as indicated by a dashed-dotted line. Each of the discharge regions R has a width of the nozzle row width Rw in +X direction, and is virtually divided by a dot pattern grid SL. A grid spacing in +Y direction and a grid spacing in +X direction in the dot pattern grid SL are determined by a discharge spacing of the droplet D. For example, the grid spacing in +Y direction in the dot pattern grid SL is determined by a product of a discharging cycle of the discharge head H and a main scanning speed of the substrate S. The grid spacing in +X direction in the dot pattern grid SL is determined by the nozzle pitch Dx.

A selection whether the droplet D is discharged or not is determined on each grid point of the dot pattern grid SL. In the present embodiment, in order to form a partial liquid film F throughout a whole area of each of the discharge regions R, all grid points in each of the discharge regions R are selected as the target point T. In FIG. 4, the grid spacing of the dot pattern grid SL is enlarged for explaining the grid points of the dot pattern grid SL.

When the discharging treatment of the droplet D is conducted, each of the nozzles N of the discharge heads H is positioned on an extended line of a group of the target points T that are aligned in +Y direction. When the main scan of the substrate S is performed, the nozzles N in one of the discharge heads H respectively face the k pieces of the target points T aligned in +X direction at the same timing. That is, the droplets D are respectively landed onto the k pieces of the target points T aligned in +X direction at a substantially same timing. The droplets D discharged in k pieces of them are landed and coalesce along +X direction, forming a partial liquid film F continuously formed in +X direction. The "substantially same timing" means a timing to form a liquid film extending in +X direction by the k pieces of the droplets D that are landed at the k pieces of the target points T aligned in +X direction, but not to cause a film thickness difference between the droplets D due to a difference of landing timing between the droplets D adjacent to each other. The group of the droplets D (the k pieces of the droplets D) landed at the substantially same timing forms a partial liquid film F in a strip shape and extending along +Y direction together with subsequent groups of the droplets D sequentially landed in −Y direction. Thus, the partial liquid film F extending in +Y direction is formed by each of the droplet discharge heads H, whereby a plurality of partial liquid films F extending in +Y direction are formed along +X direction. The plurality of partial liquid films F adjacent to each other are united, forming one liquid film F0 on the whole of the discharge surface Sa.

In a case of forming an orientation film in 3 µm thick by using the orientation film ink as the above, for example, the liquid film F0 is formed with the orientation film ink, and dried for 50 minutes at a room temperature. Alternatively, the liquid film F0 is heated to be at 40 degrees Celsius and dried for 30 minutes. Further alternatively, the liquid film F0 is heated to be at 100 degrees Celsius and pre-dried for 1 minute, and then heated to be 200 degrees Celsius and dried for 10 to 30 minutes. During the drying treatment, butyl cellosolve in the orientation film ink evaporates first as it is relatively easy to evaporate, and a solvent component having high surface tension remains in the liquid film F0. Therefore, in a case where a uniform amount of heat is provided to the liquid film F0, leveling proceeds in a center of the partial liquid film F and the liquid film F0, starting to form a film thickness difference at an edge part. In the embodiment, during the drying treatment, predetermined temperature distribution is applied to the liquid film F0 so as to advance leveling in a whole of the liquid film F0.

In a case of forming a wiring in 10 µm thick by using the silver ink described above, for example, the liquid film F0 is formed with the silver ink, dried for 60 minutes, and then fired at 900 degrees Celsius. In the embodiment, before the liquid film F0 is dried at 60 degrees Celsius, predetermined temperature distribution is applied to the liquid film F0 so as to advance leveling in the whole of the liquid film F0.

Figure 5:
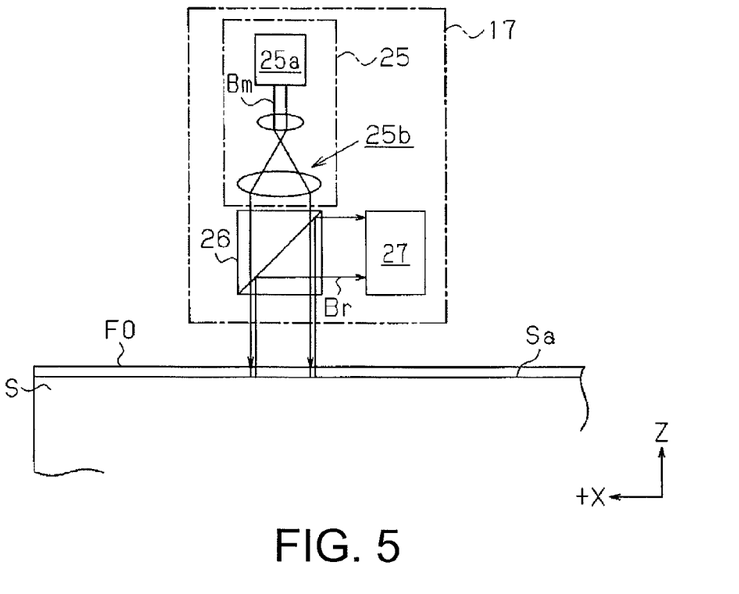
FIG. 5 is a side view schematically showing an inside of a film thickness measuring part according to the embodiment.

The film thickness measuring part 17 will now be described with reference to FIG. 5. FIG. 5 is a diagram schematically showing an inside of the film thickness measuring part 17. The film thickness measuring part 17 is an optical interference type film thickness measure for measuring a film thickness of the liquid film F0, and includes, for example, an emitting part 25, a branching part 26, and a light-receiving part 27 serving as a detecting part.

The emitting part 25 includes a light source 25a such as a single wavelength laser and a multiple wavelength laser emitting a laser beam, and a halogen lamp and a sodium vapor lamp emitting white light, and emits light from the light source 25a as measuring light Bm. The emitting part 25 further includes a light projecting optical system 25b having a collimator and a cylindrical lens, for example, and converts the measuring light Bm from the light source 25a into a parallel light beam extending in +X direction so as to guide the beam to the branching part 26.

The branching part 26 is an optical system such as a beam splitter or a half mirror, and receives the parallel light beam extending in +X direction from the emitting part 25 so as to guide it to the discharge surface Sa. Further, the branching part 26 receives the reflected light Br from the liquid film F0 (hereinafter, referred to as merely reflected light Br), and branches a light path of the reflected light Br from a light path of the measuring light Bm so as to guide the reflected light Br to the light-receiving part 27.

The light-receiving part 27 includes one dimension diode array or a CCD array, and receives the reflected light Br through the branching part 26 so as to detect an intensity of the reflected light Br at a coordinate system along +X direction. In a case of using multiple wavelength light as the measuring light Bm, the light-receiving part 27 includes a dispersion element such as a diffraction grating and an optical multilayer thin film for dispersing the reflected light Br, and detects an intensity of the reflected light Br that is dispersed by the dispersion element at each wavelength.

When the drying treatment of the liquid film F0 is conducted, the emitting part 25 shapes the measuring light Bm emitted from the light source 25a into a light beam having a predetermined width along +X direction with the light projecting optical system 25b so as to irradiate the liquid film F0 with the light beam through the branching part 26. The branching part 26 receives the reflected light Br from the liquid film F0 and guides the reflected light Br to the light-receiving part 27. The light-receiving part 27 receives the reflected light Br through the branching part 26 so as to output an output signal corresponding to an intensity of the reflected light Br.

The reflected light Br includes a component that is reflected at the surface of the liquid film F0 and a component that is reflected at the interface between the liquid film F0 and the discharge surface Sa. Therefore, the reflected light Br received by the light-receiving part 27 is an interference wave having these two kinds of components. The interference wave has information on difference of light paths of the two kinds of components. Therefore, if a reflectance of the reflected light Br is calculated based on the output signal outputted from the light-receiving part 27, the difference of the light paths of the two kinds of components, that is, a film thickness of the liquid film F0 can be obtained. The film thickness measuring part 17 continues measuring a film thickness of the whole of the liquid film F0 until the drying treatment of the liquid film F0 is completed. In the embodiment, a film thickness of a first measurement by the film thickness measuring part 17 is referred to as a first film thickness, a film thickness of a second measurement on the same position is referred to as a second film thickness, . . . , and a film thickness of an 'n' time measurement is referred to as an 'n' film thickness.

Figure 6:
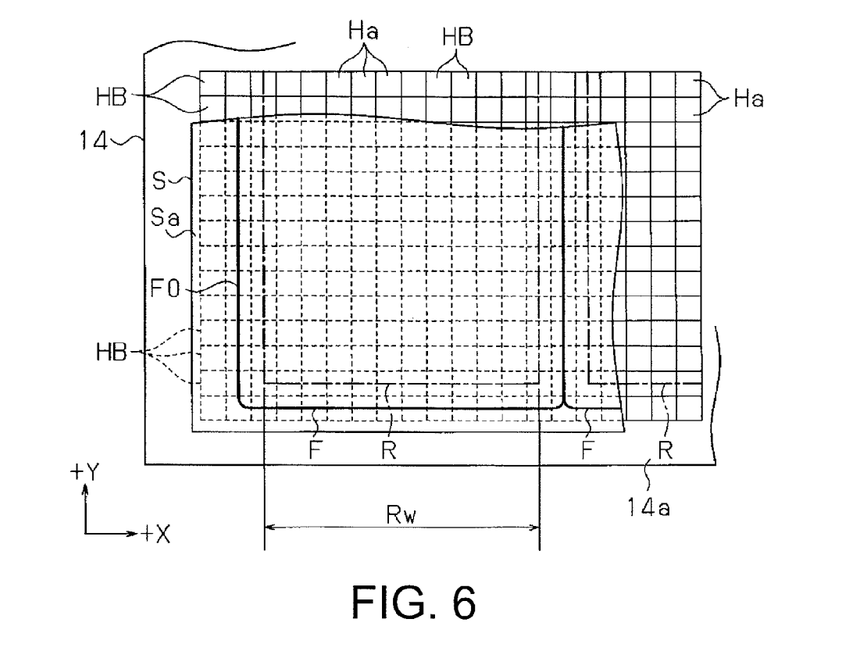
FIG. 6 is a plan view showing a position of a heater block according to the embodiment.

The substrate stage 14 will now be described with reference to FIG. 6. FIG. 6 is a plan view schematically showing an upper surface of the substrate stage 14.

Referring to FIG. 6, the substrate stage 14 is provided with a plurality of heater blocks HB on its upper surface (hereinafter, referred to as merely a "heating surface 14a"). The plurality of heater blocks HB are arranged in matrix of i pieces along +X direction×j pieces along +Y direction so as to be close-packed in the whole of +X direction and +Y direction of the heating surface 14a. An upper surface of each of the heater blocks HB (contact surface Ha) is a flat and smooth surface having thermally high bonding property with respect to a back surface of the substrate S and has a sufficiently small size with respect to one discharge region R. Each of the heater blocks HB is a heat source that is independently driven in response to a predetermined driving signal and supplies heat energy corresponding to the driving signal.

When the discharging treatment of the droplet D is conducted, each of the heater blocks HB receives a predetermined driving signal so as to supply heat energy corresponding to the driving signal to a region, contacting with the upper surface of the each of the heater blocks HB, of the substrate S. The substrate S absorbs the heat energy received from the each of the heater blocks HB so as to form temperature distribution corresponding to a calorific value of the each of the heater blocks HB. That is, the heater blocks HB form desired temperature distribution along a planar direction of the discharge surface Sa. The temperature distribution of the present embodiment is set based on a measurement result of measuring a film thickness with the film thickness measuring part 17.

Figure 7A:
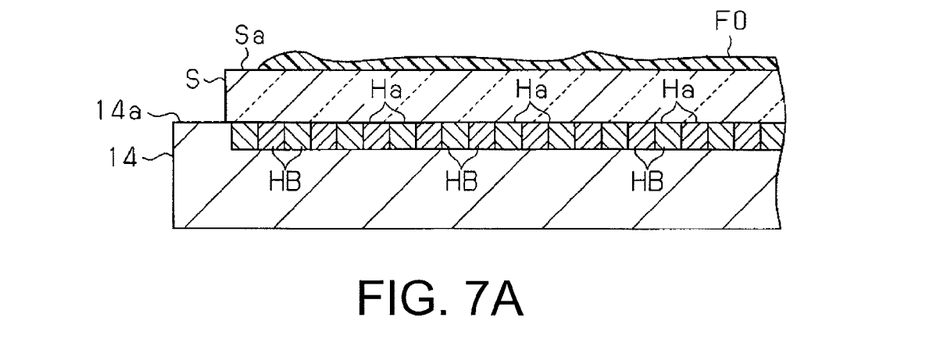
FIG. 7A is a sectional side view schematically showing a substrate stage.
Figure 7B:
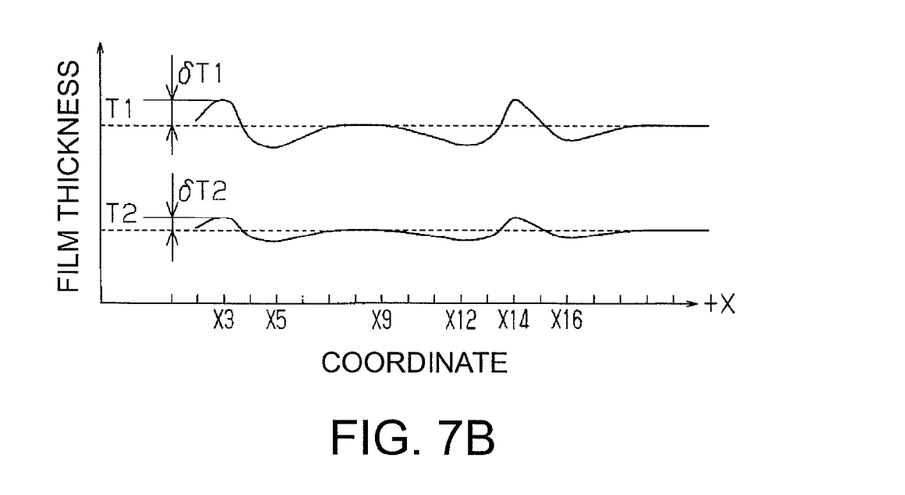
FIG. 7B is a diagram showing a film thickness profile of a liquid film.
Figure 7C:
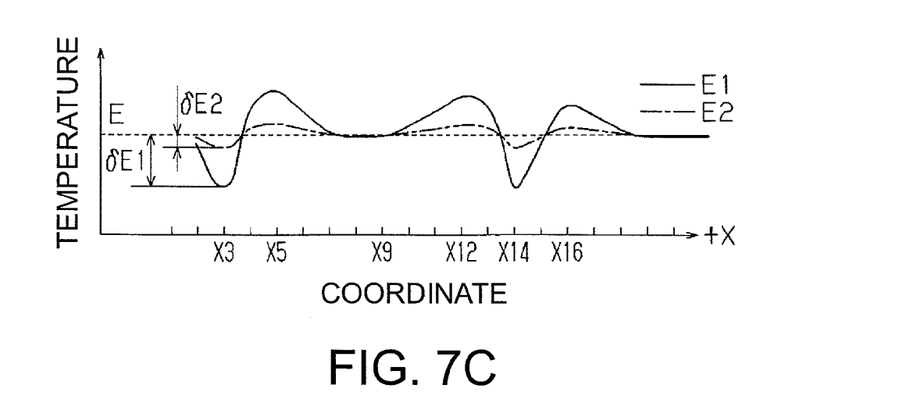
FIG. 7C is a diagram showing a temperature profile of the substrate stage.

Next, temperature distribution to be formed on the discharge surface Sa will be described below. FIG. 7A is a sectional side view of the substrate stage 14 immediately after undergoing the discharging treatment of the droplet D. FIG. 7B shows film thickness distribution of the liquid film F0 measured with the film thickness measuring part 17, and FIG. 7C shows temperature distribution formed with each of the heater blocks HB. Axes of abscissas in FIGS. 7B and 7C represent positions in +X direction on the discharge surface Sa, and coordinate values of the positions are standardized on a width of the heater blocks HB in +X direction.

Referring to FIGS. 7A to 7C, in the discharging treatment, the liquid film F0 is formed to have relatively large film thickness at both edges in +X direction of the discharge region R in order to make a specific surface area at edges of a partial liquid film F large. For example, the liquid film F0 is formed so as to have relatively thick portions respectively above the heater blocks HB at coordinates X3 and X14. Further, in the droplet discharging treatment, the liquid film F0 is formed to have portions of a relatively thin film thickness in a vicinity of its both edge portions in order to make a film material flow toward the both edge portions. For example, the liquid film F0 is formed so as to have relatively thin portions immediately above the heater blocks HB at coordinates X5, X12, and X16.

In the present embodiment, an average value of the first film thickness in the whole of the liquid film F0 is referred to as a first average film thickness T1, and an average value of the second film thickness is referred to as a second average film thickness T2. In the same manner, an average value of the 'n' film thickness is referred to as an 'n' average film thickness. Further, a difference between the first average film thickness T1 and the first film thickness at each coordinate is referred to as a first film thickness difference value δT1, and a difference between the second average film thickness T2 and the second film thickness at each coordinate is referred to as a second film thickness difference value δT2. In the same manner, a difference between the 'n' average film thickness and the 'n' film thickness at each coordinate is referred to as an 'n' film thickness difference value.

Referring to FIGS. 7A to 7C, in the drying treatment, the heater blocks HB form temperature distribution on the discharge surface Sa so as to compensate for the film thickness difference values described above. In the embodiment, initial temperature applied to the liquid film F0 is referred to as reference temperature E. Further, temperature distribution formed based on each first film thickness difference value δT1 is referred to as a first temperature E1, temperature distribution formed based on each second film thickness difference value δT2 is referred to as a second temperature E2, . . . , and temperature distribution formed based on each "n" film thickness difference value is referred to as "n" temperature. A difference value between the reference temperature E and the first temperature E1 at each coordinate is referred to as a first temperature difference value δE1, a difference value between the reference temperature E and the second temperature E2 at each coordinate is referred to as a second temperature difference value δE2, . . . , and a difference value between the reference temperature E and the "n" temperature is referred to as an "n" temperature difference value.

Each of the heater blocks HB decreases its output as a film thickness difference value corresponding to its coordinate increases so as to make a temperature of the liquid film F0 at the coordinate lower than the reference temperature E. On the other hand, each of the heater blocks HB increases its output as the film thickness difference value corresponding to its coordinate decreases so as to make the temperature of the liquid film F0 at the coordinate higher than the reference temperature E.

For example, when the film thickness measuring part 17 completes a first film thickness measurement, the heater blocks HB positioned at coordinates X3 and X14 decrease their outputs in accordance with respective first film thickness difference values δT1 so as to make temperatures of the liquid film F0 at the coordinates X3 and X14 lower than the reference temperature E. On the other hand, the heater blocks HB positioned at coordinates X5, X12, and X16 increase their outputs in accordance with respective first film thickness difference values δT1 so as to make temperatures of the liquid film F0 at the coordinates X5, X12, and X16 higher than the reference temperature E.

At this time, the portions whose film thickness is relatively large (e.g. the coordinates X3 and X14) and the portions whose film thickness is relatively small (e.g. the coordinates X5, X12, and X16) have nearly same evaporation probability of evaporation components according to the temperature distribution that is formed. Therefore, flow of the film material is suppressed, whereby concentration of the film material of the liquid film F0 becomes gradually even on the whole of the liquid film F0.

Further, when the film thickness measuring part 17 completes a second film thickness measurement process, the heater blocks HB positioned at coordinates X3 and X14 decrease their outputs in accordance with respective second film thickness difference values δT2 so as to make temperatures of the liquid film F0 at the coordinates X3 and X14 lower than the reference temperature E. On the other hand, the heater blocks HB positioned at coordinates X5, X12, and X16 respectively increase their outputs in accordance with respective second film thickness difference values δT2 so as to make temperatures of the liquid film F0 at the coordinates X5, X12, and X16 higher than the reference temperature E.

At this time, at the portions whose film thickness is relatively large (e.g. the coordinates X3 and X14) and the portions whose film thickness is relatively small (e.g. the coordinates X5, X12, and X16), the second film thickness difference values δT2 are smaller than the first film thickness difference values δT1, and the second temperature difference values δE2 are smaller than the first temperature difference values δE2 because the first temperature difference values δE1 are preliminarily formed. That is, the droplet discharge device 10 can make the 'n' film thickness difference value smaller than an 'n−1' film thickness difference value because the temperature distribution based on the 'n−1' film thickness difference value is preliminarily formed. As a result, the droplet discharge device 10 can improve film thickness uniformity of the liquid film F0 after undergoing the drying treatment in accordance with times of forming temperature distribution.

Figure 8:
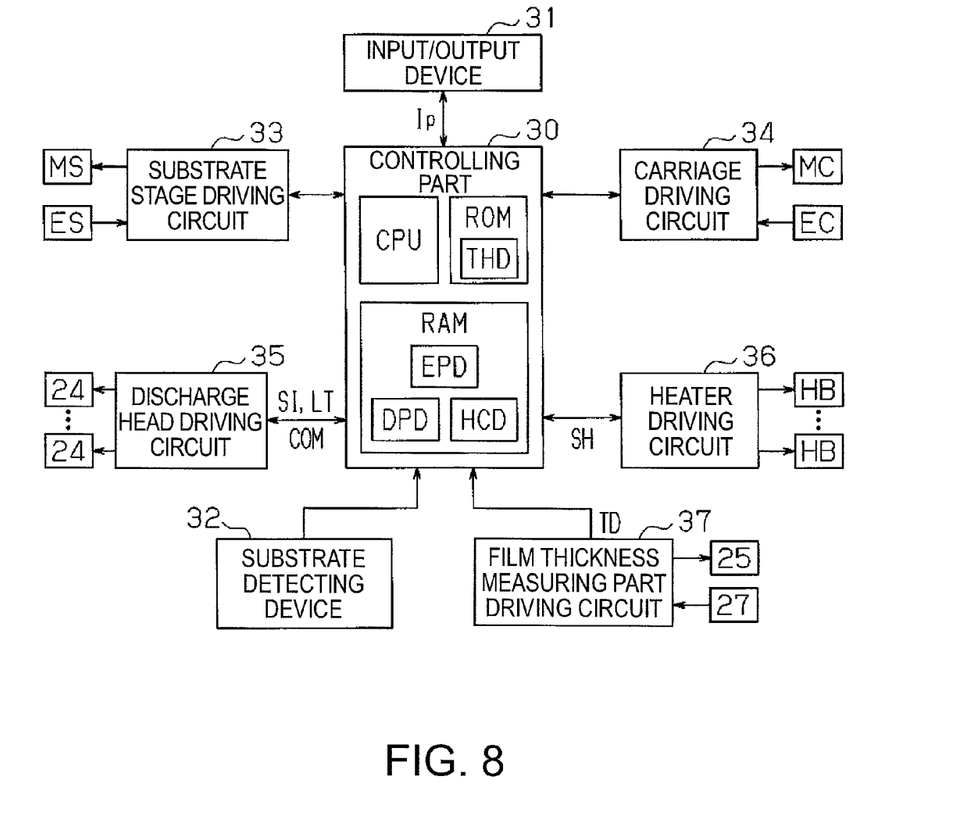
FIG. 8 is an electrical block circuit diagram showing an electrical structure of the droplet discharge device according to the embodiment.

An electrical structure of the droplet discharge device 10 structured as above will now be described with reference to FIG. 8. FIG. 8 is a block circuit diagram showing the electrical structure of the droplet discharge device 10.

Referring to FIG. 8, a controlling part 30 includes a CPU, and a ROM and a RAM that are storing units. The controlling part 30 conducts the main scan of the substrate S with the substrate stage 14, the sub scan of the droplet discharge heads H with the carriage 15, the droplet discharging treatment with the droplet discharge heads H, and the drying treatment of the liquid film F0 with the heater blocks HB in accordance with various controlling programs and various data stored in the ROM and the RAM. For example, the controlling part 30 allows the ROM to store film thickness temperature converting data THD serving as converting information.

The film thickness temperature converting data THD is for respectively relating a plurality of film thickness difference values that are different from each other to temperature difference values, that is, output values of the heater blocks HB (a look up table, for example), and is set based on various tests in advance. The liquid film F0 having a plurality of film thickness difference values that are different from each other becomes to have a predetermined even film thickness after the drying by using temperature difference values relating to the film thickness difference values in the film thickness temperature converting data THD. The controlling part 30 converts each film thickness difference value to a temperature difference value based on the film thickness temperature converting data THD.

The controlling part 30 is coupled to an input/output device 31 including various operating switches and a display, and receives various signals outputted from the input/output device 31. The controlling part 30 receives process data Ip having a predetermined format from the input/output device 31, for example. The process data Ip is used for performing the droplet discharging treatment and the drying treatment. The process data Ip includes data on the reference temperature E for drying the liquid film F0.

If the controlling part 30 receives the process data Ip outputted from the input/output device 31, the controlling part 30 conducts a predetermined expanding treatment with respect to the process data Ip so as to generate dot pattern data DPD. The dot pattern data DPD has a bit length that is same as the number of grid points of the dot pattern grid SL and defines whether the droplet D is discharged or not on each of the grid points of the dot pattern grid SL. That is, the dot pattern data DPD defines "on" or "off" of each piezoelectric element 24 in accordance with a value ("0" or "1") of each bit.

Further, if the controlling part 30 receives the process data Ip outputted from the input/output device 31, the controlling part 30 conducts a predetermined expanding treatment with respect to the process data Ip so as to store data on the reference temperature E (hereinafter, referred to as merely "reference temperature data EPD").

The controlling part 30 is coupled to a substrate detecting device 32. The substrate detecting device 32 has an imaging function for detecting an end edge of the substrate S, for example. The controlling part 30 calculates a relative position of each of the target points T with respect to the droplet discharge heads H and calculates a relative position of the substrate S with respect to the film thickness measuring part 17 based on a detecting signal received from the substrate detecting device 32.

The controlling part 30 is coupled to a substrate stage driving circuit 33 and inputs a controlling signal corresponding to the substrate stage driving circuit 33 into the circuit 33. The substrate stage driving circuit 33 rotates normally or reversely a stage motor MS for moving the substrate stage 14 in response to the controlling signal received from the controlling part 30. The substrate stage driving circuit 33 receives a detecting signal outputted from a stage motor encoder ES so as to calculate a rotating direction and a rotating speed of the stage motor MS.

The controlling part 30 calculates a moving direction and a moving amount of the substrate stage 14 based on a calculating result received from the substrate stage driving circuit 33 so as to judge whether a target point T of the discharge surface Sa is positioned immediately below a nozzle N or not. The controlling part 30 generates a timing signal LT every time each of the target points T is positioned immediately below the nozzle N so as to output the timing signal LT with respect to a discharge head driving circuit 35. Further, the controlling part 30 calculates a moving direction and a moving amount of the substrate stage 14 based on a calculating result received from the substrate stage driving circuit 33 so as to judge whether the substrate S is positioned immediately below the film thickness measuring part 17 or not. If the substrate S is positioned immediately below the film thickness measuring part 17, the controlling part 30 outputs a signal for starting a film thickness measuring treatment to a film thickness measuring part driving circuit 37.

The controlling part 30 is coupled to a carriage driving circuit 34, and inputs a controlling signal corresponding to the carriage driving circuit 34 into the circuit 34. The carriage driving circuit 34 rotates normally or reversely a carriage motor MC for moving the carriage 15 in response to the controlling signal received from the controlling part 30. The carriage driving circuit 34 receives a detecting signal outputted from a carriage motor encoder EC so as to calculate a rotating direction and a rotating speed of the carriage motor MC. The controlling part 30 calculates a moving direction and a moving amount of the carriage 15 based on a calculating result received from the carriage driving circuit 34 so as to position a nozzle N on a main scanning route of each of the target points T.

The controlling part 30 is coupled to the discharge head driving circuit 35, and inputs a timing signal LT and a driving waveform signal COM for driving the pressure generating element 24 into the discharge head driving circuit 35. The controlling part 30 generates a serial pattern data SI for serially transferring the dot pattern data DPD so as to serially transfer the serial pattern data SI to the discharge head driving circuit 35. The discharge head driving circuit 35 receives the serial pattern data SI outputted from the controlling part 30 and then serial/parallel-converts the data SI so as to generate parallel pattern data for allowing each bit value of the dot pattern data DPD to correspond to one of k pieces of nozzles N, that is, one of k pieces of pressure generating elements 24. If the discharge head driving circuit 35 receives the timing signal LT outputted from the controlling part 30, the circuit 35 supplies a driving waveform signal COM to a pressure generating element 24 to which a discharging operation is required based on the parallel pattern data. In the present embodiment, if the discharge head driving circuit 35 receives the timing signal LT, the circuit 35 supplies the driving waveform COM to all of the pressure generating elements 24. Thus the controlling part 30 lands the droplet D on each of the target points T arranged along +X direction.

The controlling part 30 is coupled to the film thickness measuring part driving circuit 37 included in a liquid film information generating part. The controlling part 30 outputs a signal for starting the film thickness measuring treatment to the film thickness measuring part driving circuit 37. The film thickness measuring part driving circuit 37 drives the emitting part 25 in response to the signal received from the controlling part 30. The film thickness measuring part driving circuit 37 A/D-converts an output signal from the light-receiving part 27 so as to input data on an intensity of the reflected light Br (hereinafter, referred to as merely "reflected light data TD") as a digital value into the controlling part 30. The controlling part 30 calculates film thickness distribution and an average film thickness of the liquid film F0 each time the reflected light data TD is inputted so as to calculate a film thickness difference value of each coordinate. The controlling part 30 reads out the film thickness temperature converting data THD stored in the ROM and then converts the film thickness difference value of each coordinate into a temperature difference value so as to generate a driving signal of each of the heater blocks HB for obtaining the temperature difference value (hereinafter, referred to as merely "heater driving signal SH").

The controlling part 30 is coupled to a heater driving circuit 36. The controlling part 30 generates a heater driving signal SH and outputs the heater driving signal SH with respect to the heater driving circuit 36. The heater driving circuit 36 drives each of the heater blocks HB in response to the heater driving signal SH received from the controlling part 30 so as to form predetermined temperature distribution on the liquid film F0.

A method for forming a film with the droplet discharge device 10 will now be described.

As shown in FIG. 1, the substrate S is placed on the substrate stage 14 in a manner allowing a discharge surface Sa of the substrate S to face up. At this time, the substrate S is disposed such that an end part thereof in +Y direction is positioned in −Y direction (an opposite direction of +Y direction) of the droplet discharge heads H. If the controlling part 30 receives the process data Ip outputted from the input/output device 31, the controlling part 30 generates the dot pattern data DPD and reference temperature data HCD based on the process data Ip so as to store them. Then the controlling part 30 generates the heater driving signal SH in reference to the reference temperature data HCD so as to drive each of the heater blocks HB through the heater driving circuit 36, that is, maintain the temperature of the discharge surface Sa at the reference temperature E.

If the temperature of the heating surface 14a reaches the reference temperature E, the controlling part 30 drives the carriage motor MC through the carriage driving circuit 34 so as to position a nozzle N on a main scanning route of each of the target points T. Then the controlling part 30 drives the stage motor MS through the substrate stage driving circuit 33 so as to start the main scan of the substrate S.

The controlling part 30 calculates a relative position of each of the target points T with respect to the droplet discharge heads H based on a detecting signal received from the substrate detecting device 32 and calculates a relative position thereafter based on a calculating result received from the substrate stage driving circuit 33. The controlling part 30 judges whether each of the target points T is positioned immediately below a nozzle N or not based on the relative position of the each of the target points T with respect to the droplet discharge heads H. Every time each of the target points T is positioned immediately below a nozzle N, the controlling part 30 generates a timing signal LT so as to output the timing signal LT to the discharge head driving circuit 35. That is, whenever the k pieces of target points T arranged in +X direction are positioned immediately below the k pieces of nozzles N, the controlling part 30 lands the droplets D to the k pieces of the target points T. The droplets D on the target points T form a plurality of partial liquid films F extending in +Y direction. The plurality of partial liquid films F unite along +X direction so as to form one liquid film F0 on the whole of the discharge surface Sa.

The controlling part 30 calculates a relative position of the substrate S with respect to the film thickness measuring part 17 based on a calculating result received from the substrate stage driving circuit 33. If the substrate S is positioned immediately below the film thickness measuring part 17, the controlling part 30 starts the film thickness measuring treatment and the drying treatment of the liquid film F0. That is, the controlling part 30 calculates a film thickness difference value of each coordinate in response to reflected light data TD received from the film thickness measuring part driving circuit 37 and reads out the film thickness temperature converting data THD so as to convert the film thickness difference value of each coordinate into a temperature difference value.

Then the controlling part 30 generates a heater driving signal SH for obtaining each temperature difference value so as to output the heater driving signal SH to the heater driving circuit 36, and then drives each of the heater blocks HB through the heater driving circuit 36 so as to form temperature distribution on the liquid film F0. Thus, the controlling part 30 forms the temperature distribution corresponding to the film thickness difference values, being able to improve the film thickness uniformity of the liquid film F0 in the drying treatment. Thereafter, the controlling part 30 similarly repeats the film thickness measuring treatment so as to update the reflected light data TD until the drying treatment of the liquid film F0 is completed. Whenever the controlling part 30 receives the reflected light data TD, the controlling part 30 generates a heater driving signal SH so as to form temperature distribution corresponding to film thickness difference values. Thus, the controlling part 30 updates the temperature distribution, being able to improve the film thickness uniformity of the liquid film F0 after the drying treatment.

Here, advantageous effects of the embodiment will be described.

(1) In the embodiment, the film thickness measuring part 17 measures distribution of the reflected light Br on the liquid film F0 so as to generate reflected light data TD. The controlling part 30 calculates a film thickness difference value of each coordinate based on the reflected light data TD and converts the film thickness difference value of each coordinate based on the film thickness temperature converting data THD. Then the controlling part 30 forms temperature distribution corresponding to distribution of the film thickness difference value on the liquid film F0 and conducts the drying treatment of the liquid film F0.

Therefore, the droplet discharge device 10 determines distribution of temperatures of the liquid film F0 based on the film thickness distribution, so that the uniformity of the film thickness of the liquid film F0 after the drying treatment can be improved, and further, the controllability of the film thickness can be improved.

(2) In the embodiment, the film thickness measuring part 17 measures distribution of the reflected light Br on the liquid film F0 plural times so as to update the reflected light data TD. Every time the film thickness measuring part 17 updates the reflected light data TD, the controlling part 30 generates a heater driving signal SH corresponding to the reflected light data TD that is updated so as to form temperature distribution corresponding to the reflected light data TD on the liquid film F0.

Therefore, the droplet discharge device 10 can newly form temperature distribution on the liquid film F0 in a process of the drying treatment in accordance with fluctuation of the film thickness distribution. Accordingly, the droplet discharge device 10 can securely improve the uniformity of the film thickness of the liquid film F0 after the drying in accordance with times of measuring film thickness distribution.

(3) In the embodiment, the controlling part 30 applies a relatively low temperature with respect to a relatively thick portion of the liquid film F0 and applies a relatively high temperature with respect to a relatively thin portion of the liquid film F0.

Therefore, the droplet discharge device 10 makes the relatively thick portion of the liquid film F0 have a low temperature. Further, the device 10 makes the relatively thin portion of the liquid film F0 have a high temperature. The droplet discharge device 10 can make evaporation probability of a portion having a large film thickness low and make evaporation probability of a portion having a small film thickness high. As a result, the droplet discharge device 10 can make evaporation probability even on the whole of the liquid film F0, being able to more securely improve the uniformity of the film thickness of the liquid film F0 after the drying.

(4) In the embodiment, the droplet discharge device 10 includes the plurality of heater blocks HB thermally contacting with regions, which are different from each other, of the liquid film F0, and drives each of the plurality of heater blocks HB so as to form temperature distribution on the liquid film F0. Therefore, the droplet discharge device 10 can improve the controllability of the temperature distribution and make distribution of evaporation provability of the liquid film F0 be even on the whole of the liquid film F0 under higher accuracy. As a result, the droplet discharge device 10 can more securely improve the film thickness uniformity of the liquid film F0 after the drying.

The above-mentioned embodiment may be changed as the following.

In the embodiment, the droplet discharge device 10 obtains liquid film information by calculating the reflectance of the reflected light Br. However, the droplet discharge device 10 may obtain information on refractive index or extinction coefficient of the liquid film F0 by calculating the reflectance of the reflected light Br.

The ink Ik fluctuates a refractive index and an extinction coefficient due to evaporation of the solvent component and the like. Therefore, if information on the refractive index or the extinction coefficient of the liquid film F0 is obtained, information on a composition of the liquid film F0, that is, information on a drying state of the liquid film F0 can be obtained. According to such structure, heat quantity corresponding to the drying state of the liquid film F0 can be supplied to the liquid film F0.

In the embodiment, the droplet discharge device 10 calculates the reflectance of the reflected light Br so as to obtain liquid film information. However, the droplet discharge device 10 may image an interference pattern of the reflected light Br at the imaging part 27 and Fourier-converts the interference pattern so as to obtain lightwave information (phase or amplitude) of the reflected light Br, and further, information on the liquid film F0. In this structure as well, heat quantity corresponding to the drying state of the liquid film F0 can be supplied.

In the embodiment, the droplet discharge device 10 calculates the reflectance of the reflected light Br so as to obtain liquid film information. However, the droplet discharge device 10 may calculate a film shape of the liquid film F0, that is, surface coordinates in Z direction of the surface of the liquid film F0 in accordance with intensity distribution of the reflected light Br detected by the light-receiving part 27.

An imaging position of the reflected light Br varies depending on a film shape of the liquid film F0. For example, in a case where a film shape of the liquid film F0 has an inclination, an imaging position of the reflected light Br is displaced toward a position corresponding to the inclination of the film shape. Therefore, if variation of the imaging position is converted into an angle of the surface, the film shape of the liquid film F0, that is, the surface coordinates can be obtained. According to this structure, the surface coordinates of the liquid film F0 can be measured based on the intensity distribution of the reflected light Br and can supply heat quantity corresponding to the film shape of the liquid film F0 to the liquid film F0.

In the embodiment, the droplet discharge device 10 calculates the reflectance of the reflected light Br so as to obtain liquid film information. However, the droplet discharge device 10 may include a lifting and lowering mechanism moving the film thickness measuring part 17 or the substrate stage 14 upward and downward along Z direction, and detect a focal distance of the emitting part 25 with respect to the surface of the liquid film F0 based on an intensity, which is detected by the light-receiving part 27, of the reflected light Br.

In a case where an optical image formed on a surface of the liquid film F0 is defocused, an amount of light of the reflected light Br that is detected by the light-receiving part 27 is decreased compared to an optical image that is focused. When the droplet discharge device 10 conducts the drying treatment, the device 10 moves the film thickness measuring part 17 or the substrate stage 14 upward and downward along Z direction so as to detect a height at which the reflected light Br comes to have a predetermined amount of light of the reflected light Br that is focused, that is, a surface coordinate of the liquid film F0. According to this structure, the surface coordinate of the liquid film F0 can be measured based on the focal distance and can supply heat quantity corresponding to the surface coordinate, that is, the film shape of the liquid film F0 to the liquid film F0.

In the embodiment, the film thickness measuring part 17 measures an intensity of the reflected light Br from the liquid film F0 by an interference method. However, the film thickness measuring part 17 may detect polarization variation (phase difference or amplitude difference, for example) between the measuring light Bm and the reflected light Br so as to calculate an optical constant (reflectance, refractive index, or extinction coefficient) related to the film thickness, that is, the film thickness measuring part 17 may employ ellipsometry. In this structure as well, as is the case with the embodiment described above, the film thickness of the liquid film F0 can be calculated based on an optical constant, being able to improve the film thickness controllability of the liquid film F0 after the drying.

Further, in a case where an orientation film is formed with the orientation film ink, as the drying state of the liquid film F0 progresses, the reflected light Br from the liquid film F0 decreases absorbed fraction by an absorption wavelength corresponding to a solvent component that easily evaporates, and increases a reflectance by the absorption wavelength. The reflected light Br from the liquid film F0 includes information on a refractive index or an extinction coefficient corresponding to an concentration of an orientation film material.

Furthermore, in a case where a wiring is formed with the silver ink described above, as the drying state of the liquid film F0 progresses, the reflected light Br from the liquid film F0 decreases absorbed fraction by an absorption wavelength corresponding to a solvent component that easily evaporates, and increases a reflectance by the absorption wavelength. As the drying state of the liquid film F0 progresses, the reflected light Br from the liquid film F0 increases a refractive index in a visible light region while silver fine particles becomes highly concentrated. The reflected light Br from the liquid film F0 includes information on a refractive index or an extinction coefficient corresponding to the concentration of the silver fine particles.

Therefore, in the droplet discharge device 10, the film thickness temperature converting data THD may be data for respectively relating a plurality of optical constants that are different from each other to temperatures, that is, output values of the heater blocks HB, and the film thickness measuring part 17 may detect an optical constant on the film thickness of the thin film. In addition, the controlling part 30 may relate the optical constant of each position of the liquid film F0 to a drying temperature based on the film thickness temperature converting data THD.

According to this structure, the droplet discharge device 10 can form temperature distribution corresponding to the drying state of the liquid film F0 irrespective of the film thickness of the liquid film F0. That is, even if film thicknesses of respective positions on the liquid film F0 are same as each other, in a case where concentrations of the film material on respective positions of the liquid film F0 are different from each other, the droplet discharge device 10 can form temperature distribution corresponding to the concentration distribution.

For example, the controlling part 30 applies a relatively low temperature to a portion having relatively high concentration of the film material, or applies a relatively high temperature to a portion having relatively low concentration of the film material. Accordingly, even if the film thicknesses on the liquid film F0 are same as each other, the droplet discharge device 10 can decrease an evaporation probability of a portion that is possibly to have large film thickness, or increase an evaporation probability of a portion that is possibly to have small film thickness. As a result, the droplet discharge device 10 can more securely improve the film thickness uniformity of the liquid film F0 after the drying.

In the embodiment, the droplet discharge device 10 obtains a film shape of the liquid film F0 based on the reflected light Br from the liquid film F0. However, the droplet discharge device 10 may obtain a film shape or an optical constant of the liquid film F0 based on transmission light, scattered light, diffraction light, and the like through the liquid film F0. That is, it is enough that the droplet discharge device 10 has such structure that the device 10 receives light from the liquid film F0 to obtain a film shape or an optical constant of the liquid film F0.

In the embodiment, the droplet discharge device 10 includes the discharging unit 11 and the drying unit 12. However, the droplet discharge device 10 may have such structure that the droplet discharge heads H and the film thickness measuring part 17 are mounted on one carriage 15 so as to share the discharging unit 11 and the drying unit 12. Alternatively, the droplet discharge device 10 may include only the discharging unit 11. In this case, a drying device including the drying unit 12 may be separately provided and the droplet discharging treatment and the drying treatment may be conducted by separate devices.

In the embodiment, the droplet discharge device 14 reciprocates between the discharging unit 11 and the drying unit 12. However, the droplet discharge device 10 may include substrate stages 14 for both of the discharging unit 11 and the drying unit 12 and enable a substrate transfer between these substrate stages 14.

The number of the nozzle row is one in the embodiment, but it may be two or more.

The droplet discharge device 10 conducts the film forming treatment employing the single scan method in the embodiment, but the device 10 may conduct a film forming treatment employing a multi-scan method.

In the embodiment, the heater blocks HB heat the discharge surface Sa when the droplet is discharged. However, the heater blocks HB may heat the discharge surface Sa after the liquid film F0 is formed, for example.

In the embodiment, when the droplet D is discharged, the controlling part 30 generates the heater driving signal SH for allowing the discharge surface Sa to have the reference temperature E so as to maintain the temperature of the discharge surface Sa at the reference temperature E. However, coordinates (coordinates X3 and X14 in FIG. 7, for example) of portions that possibly become thick in the liquid film F0 may be detected based on tests and the like in advance, and the controlling part 30 may output the heater driving signal SH for allowing the portions at the coordinates to have a low temperature when the droplet D is discharged. For example, the controlling part 30 may output the heater driving signal SH for allowing edges of each of the discharge regions R to have a low temperature when the droplet D is discharged. Further, coordinates (coordinates X5, X12, and X16 in FIG. 7, for example) of portions that possibly become thin in the liquid film F0 may be detected based on tests and the like in advance, and the controlling part 30 may output the heater driving signal SH for allowing the portions at the coordinates to have a high temperature when the droplet D is discharged.

Accordingly, the droplet discharge device 10 forms temperature distribution when the device 10 discharges the droplet D, being able to improve the film thickness uniformity of the liquid film F0 after the drying.

The entire disclosure of Japanese Patent Application Nos: 2007-212648, filed Aug. 17, 2007 and 2008-182378, filed Jul. 14, 2008 are expressly incorporated by reference herein.

What is claimed is:

1. A film-forming method, comprising:
   a) discharging a liquid including a film material on an object so as to form a liquid film made of the liquid;
   b) irradiating the liquid film with measurement light and thus detecting reflection light from the liquid film so as to measure distribution of an optical constant, the optical constant being related to a film thickness with respect to the liquid film; and
   c) drying the liquid film on the object by a plurality of heater units so as to form a thin film by converting the distribution of the optical constant into distribution of a temperature of the liquid film based on converting information that relates to the optical constant of the liquid film to the temperature of the liquid film and thus forming the distribution of the temperature on the liquid film, wherein
   the plurality of heater units are provided in the vicinity of the liquid film, and temperatures of each of the plurality of heater units are independently controlled based on the distribution of the temperature of the liquid film to supply heat energy to the liquid film so as to dry the liquid film for forming the thin film.

2. The film-forming method according to claim 1, wherein the converting information assigns a portion of the liquid film that has a higher concentration of the film material than other part of the liquid film to a lower temperature than the other part.

3. The film-forming method according to claim 1, wherein the converting information assigns a portion of the liquid film that has a lower concentration of the film material than other part of the liquid film to a higher temperature than the other part.

* * * * *